Aug. 6, 1957   C. D. MacCRACKEN   2,802,088
HEATING UNITS
Filed Dec. 10, 1954
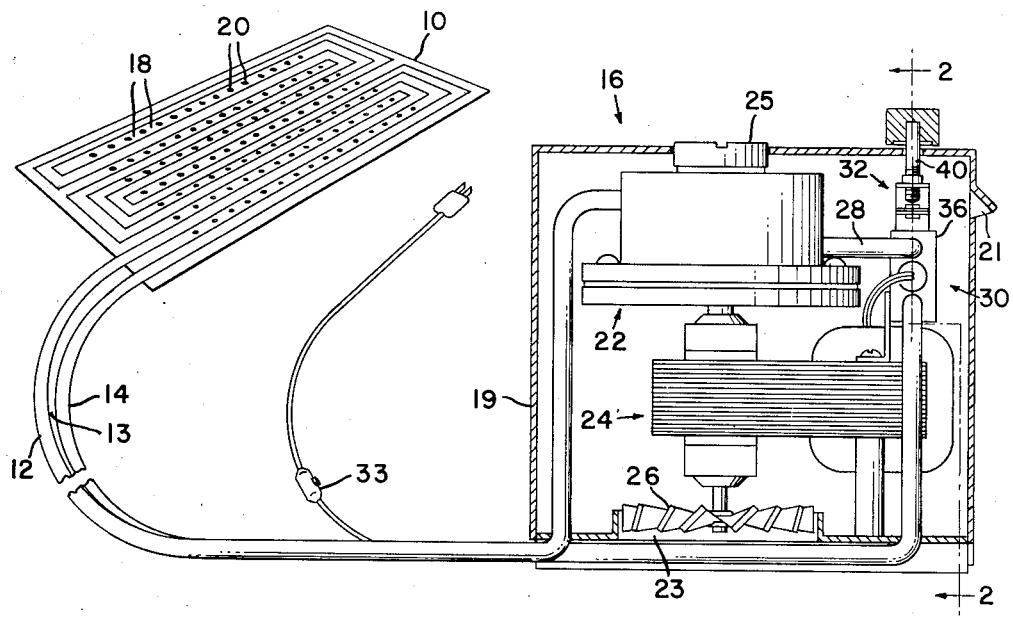
Fig. 1.
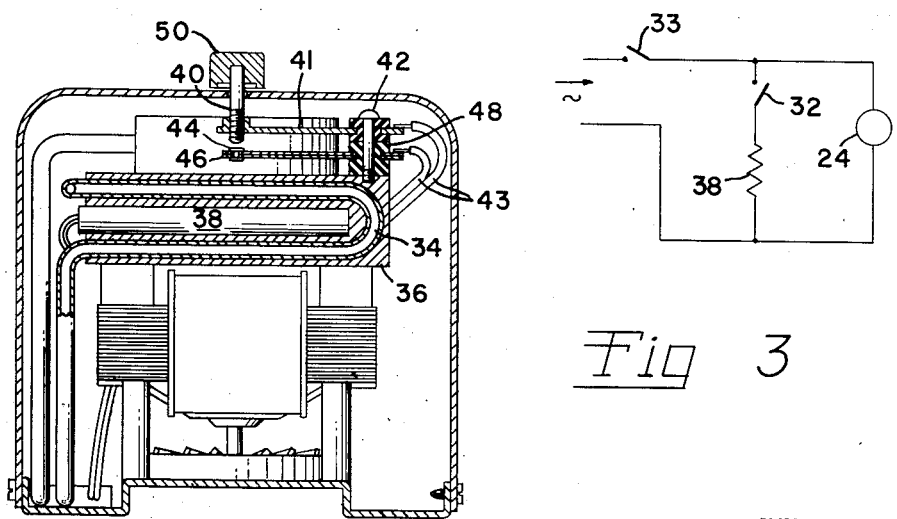
Fig. 2
Fig 3
INVENTOR.
CALVIN D. MacCRACKEN
BY James M. Relph
ATTORNEY United States Patent Office 2,802,088
Patented Aug. 6, 1957

2,802,088

HEATING UNITS

Calvin D. MacCracken, Tenafly, N. J., assignor to Jet-Heet, Inc., Englewood, N. J., a corporation of New York Application December 10, 1954, Serial No. 474,446

11 Claims. (Cl. 219—39)

This invention relates to improvements in heating units, and particularly to an improved heating unit for a personal heating device in which heated liquid is circulated through a flexible panel to warm a person's body in contact with the panel, as well as a novel method of operation and control of such units.

In a co-pending application of Calvin D. MacCracken, filed July 20, 1953, Serial Number 369,198, assigned to the assignee of the present invention, there is described and claimed a personal thermal device of the general type with which the present invention is concerned. In the apparatus described in the foregoing co-pending application, a motor-driven pump is utilized to circulate liquid through a flexible, multi-channel heat exchange panel which is adapted to be used as a pillow insert, a mattress pad or the like. Upon circulation of liquid through the panel, the user's body is either warmed or cooled by receiving heat from or losing heat to the circulating liquid, depending on the specific temperature.

In the specific embodiment disclosed in the above-mentioned application, heat is supplied when needed by an electric heating element of the so-called "immersion type" which extends into a container on which the pump is mounted. The supply of heat is controlled by a manual switch in the electric circuit.

While the foregoing arrangement is satisfactory under some conditions of use, it has certain limitations that it is the general object of the present invention to overcome.

For one thing, there is always the possibility that the heating element will be turned on inadvertently when there is no liquid in the system. If this happens, of course, the heating element is quite likely to overheat and cause damage to itself and associated parts of the apparatus. Similarly, if a stoppage occurs in the liquid conducting circuit, the liquid trapped in the container may become overheated with possible damage resulting.

A further shortcoming of the above-mentioned apparatus is that a simple manual control switch requires more or less constant attention of the user to maintain the desired temperature at the heating panel. Even if provided with a number of graduated temperature settings (e. g., "low," "medium" and "high"), under changing conditions any given temperature setting selected will be unsatisfactory. In fact, even an arrangement for maintaining a constant panel temperature with changing ambient is unsatisfactory under some circumstances.

It is accordingly, among the objects of the present invention to provide a system of the foregoing type in which the temperature of the circulating liquid is controlled automatically, and, further, in which the apparatus is protected against damage due to overheating in the event of failure of the circulating pump, loss of the heat-exchange liquid or the like. A related object is the provision of an improved method of temperature control.

In accordance with a preferred embodiment of the invention, the foregoing and other related objects and advantages are attained in a heating unit for a liquid-circulation-type personal heating system which includes a chamber wherein the liquid is heated by an electric heating element in heat-exchange relation with the chamber wall. A temperature-sensitive switch in the heater circuit is connected to control the supply of current to the heater as a function both of chamber wall temperature and of ambient temperature. With this arrangement, not only is the temperature of the circulating liquid continuously monitored through its effect on the chamber wall temperature, but also the effect of changing ambient is compensated. In addition, any tendency toward overheating of the heater can instantly be detected and prevented from causing any damage, because of its effect on the temperature of the chamber wall.

A more complete understanding of the invention, and of further objects and features thereof, can be had by reference to the following description of illustrative embodiments thereof, when considered in connection with the accompanying drawing, wherein Figure 1 is a diagram of a personal heating system embodying the invention, with the heat exchange panel shown in perspective and the circulator shown in elevational view with the housing in section, Figure 2 is a section view of the heat unit in the system of Figure 1, taken on the line 2—2 in Figure 1, and Figure 3 is a schematic diagram of the electric circuit in the system of Figure 1.

Referring to Figure 1 of the drawing, a personal heating system embodying the invention is shown to include a flexible, liquid-conducting panel 10 coupled by a pair of flexible tubes 12, 14 to a circulating and heating unit 16.

For illustrative purposes, the panel 10 is shown to comprise two superposed sheets of waterproof material, such as one of the vinyl plastics, sealed together along the outside edges and along spaced lines 18 to define passages between the seal lines through which liquid can be circulated. In some instances, the seal lines may be provided with many small perforations 20 to prevent accumulation of perspiration or other moisture on the panel surface, although such perforations may not be required where the panel is used under a mattress pad, for example. It may be noted that the panel can be made in a variety of forms, shapes and sizes, depending on the particular purpose for which it is used. For example, one very beneficial use is as a pillow insert, the panel being of a suitable size to be placed on the pillow body under the pillowcase, to warm or cool the user's head as conditions require. In a larger size, the panel may be used to warm or cool substantially the entire body of the user, being located for this purpose on the mattress of a bed, as previously mentioned, or spread over the seat of an automobile. A panel of similar size has further utility as the floor pad or floor mat in a child's playpen. Alternatively, the panel may comprise a fabric structure provided with tubing defining the liquid conducting passages. Whatever its construction or location, the panel 10 will carry heat away from or supply heat to the user's body, depending on the relative temperature of the liquid circulated through the passages. While the present invention primarily is concerned with controlling the apparatus when the circulating liquid is to be heated, it will be understood that the control system described hereinafter will in no wise interfere with use of the apparatus for cooling purposes. Accordingly, the coupling tubes 12, 14 may be made relatively long, say of the order of eight feet, to provide ample heat dissipating surface for cooling the circulating liquid if desired. When used for heating, the coupling lines can be coiled up and placed in an insulated bag or the like, or otherwise covered to reduce heat losses. For convenience in handling, the coupling tubes preferably are joined by a central web 13.

The circulating and heating unit 16 is enclosed in a housing 19 having a louvered air-inlet opening 21 in the upper portion of one side panel. Inside the housing, one of the tubes (12) is connected to the inlet of a liquid circulator, such as a centrifugal pump 22 driven by a motor 24. A fan 26 preferably is mounted on the motor shaft below the motor to draw air through the housing 19 from the inlet opening 21 and discharge the air through an outlet opening 23 in the bottom pan below the fan. For simplicity, the pump and motor will not be described in detail, as they may take a variety of forms within the scope of the present invention. A preferred type of pump is shown in a co-pending application of Calvin D. MacCracken et al., filed June 25, 1954, Serial No. 439,206, assigned to the assignee of the present invention. In general, any pump other than a constant displacement pump is suitable. A constant displacement pump, such as a gear pump, is likely to build up sufficient pressure to rupture a coupling line or a panel passage if a stoppage occurs in the liquid circuit. The pump may be provided with a fill cap 25 which is exposed in the top panel of the housing so that the assembly can be shipped dry and filled by the user.

The outlet side of the pump is connected by a tube 28 to a heat exchanger 30 wherein the system liquid can be heated to a selected and automatically regulated temperature, as determined by the setting of a thermostatic control 32, described hereinafter. The outlet of the heat exchanger is connected to the other coupling tube 14 to complete the liquid circuit.

As shown in Figures 1 and 2, one suitable form of heat exchanger comprises a U-shaped section of tubing 34 embedded in a two-piece metal block 36. Also embedded in the block 36 between the two legs of the U-tube is a cylindrical electric heating element 38 for heating liquid flowing through the tube 34. With this arrangement, the tube 34 which defines the heat exchange chamber is essentially integral with the block 36, so that the block can be considered to be a part of the wall of the heat exchange chamber.

Current for the heating element 38 is supplied through an electric circuit (Figure 3) which includes a temperature-controlled switch 32 connected in series with the heating element 38. The heater circuit is in parallel with the motor 24, both being controlled by a main switch 33.

As best seen in Figure 2, the thermostatic switch 32 includes an adjustable contact in the form of a screw 40 threaded in a support plate 41 which extends over the heat exchanger block 36 from a mounting screw 42 threaded into the block 36. A movable contact 44 is carried at the free end of a bimetallic strip 46 which extends from the mounting screw 42 between the block 36 and the plate 41. The plate 41 and the bimetal 46 are separated from each other and from the block 36 by insulating washers 48. Leads 43 are connected to the plate 41 and the bimetal 46 to carry current thereto. For simplicity, only those parts of the switch 32 are shown which are essential to an understanding of the invention, it being understood that additional components may be added, if desired, to insure positive, anti-chattering action of the contacts 40, 44 in the manner common to such switches.

The bimetal strip 46, being composed of layers of metal having dissimilar coefficients of thermal expansion, has the customary characteristic of bending or flexing in response to temperature changes, thereby to move the contact 44 toward and away from the adjustable contact 40. The exact temperature at which the contacts 40, 44 will come together can be varied by rotating the screw 40 by means of an insulated knob 50. Thus, the flow of current to the heating element 38 will be controlled by the switch 32, which, in turn, will open and close in accordance with the setting of the screw 40 and the temperature of the bimetal 46.

It will be noted that the bimetal element 46 is exposed to the heat exchanger surface so that it will receive radiant heat from the heat exchanger. The bimetal element also is located adjacent the inlet opening 21 in the path of air drawn through the casing by the fan 26. Accordingly, the ambient temperature outside the housing 19 also will have an effect on the bimetal temperature and, hence, on the opening and closing of the contacts 40, 44. A relatively small amount of heat may also be carried to the bimetal from the heat exchanger by conduction through the mounting screw 42.

By exposing the temperature-sensitive portion of the switch 32 to these several controlling temperatures, a number of important results are obtained. For one thing, as long as liquid flows through the tube 34, the temperature of the heat exchanger will be influenced greatly by the temperature of the circulating liquid, thereby giving an accurate and continuous monitoring of temperature conditions at the panel 10. A change in temperature at the panel, whether due to an ambient change or any other factor, will be reflected in the temperature of the liquid returning from the panel. As the temperature of the heat exchanger wall changes, the radiation to the bimetal will change, influencing the switch 32 to interrupt or initiate the flow of heating current to the heater 48 as required. Furthermore, if the temperature of the heat exchanger should tend to increase beyond a safe limit for any reason, the switch 32 will sense such a condition and turn off the heating current long before any damage is done. This is particularly important for protection of the heating element 38, as such elements ordinarily are designed to operate satisfactorily only if the heat generated is carried away fairly rapidly. For example, if the liquid should be lost from the system through a leak, or if a stoppage in the circulating path should develop, the temperature quickly will begin to rise abnormally as the flow of liquid stops, since there is no way for the heat to be dissipated. This temperature rise will immediately cause the switch 32 to open, thereby cutting off the supply of heater current to protect the heater 38 and associated parts.

Another important feature is the control of the liquid temperature as the ambient temperature changes.

At first impression, it might be thought that the average panel temperature should be maintained essentially constant for best comfort conditions, regardless of ambient temperature changes. If this were true, it would be unnecessary to sense the ambient temperature directly, because the effect of liquid temperature as transmitted through the heat exchanger would be adequate. However, it has been found that a constant average panel temperature is not entirely satisfactory. While the reason for this is not definitely established, a possible theory is that as the ambient temperature decreases, the body loses more heat from exposed parts (primarily the head) and also loses more heat in breathing colder air. Therefore, if a constant average panel temperature is maintained with changing ambient, the user is not necessarily kept warm enough at the lower ambients. What is required is that the average panel temperature increase with decreasing ambient, and conversely, decrease with increasing ambient. In other words, the panel temperature should vary in such fashion as to over-compensate for ambient changes.

In accordance with the present invention, therefore, the bimetal is exposed both to a current of air drawn into the housing from the outside and to the effect of radiant or conduction heat from the heat exchanger in order that over-compensation can be obtained. At the same time, protection for the heater is maintained by the radiation or conduction coupling between the thermostat and the heat exchanger, so that any loss of the tempering effect of the liquid on the heat exchanger block immediately will be reflected in an increase in radiant heat which will quickly over-ride the ambient air effect and shut off the heater.

In operation, a decrease in liquid temperature or in ambient air temperature will cause the switch contacts to close, initiating heating current flow. When the liquid temperature has risen sufficiently, the radiant heat from the heat exchanger block will open the switch. Thereafter, assuming no change in the ambient temperature, the switch will open and close periodically as required to maintain the liquid temperature essentially constant. However, if the ambient temperature should decrease, causing the switch to close, it is evident that the radiant heat from the heat exchanger will have to increase to bring the bimetal temperature back to its "opening" value. This can only occur if the liquid temperature increases. Consequently, the heater "on" periods will have to increase in length to establish a new (higher) average liquid temperature.

It can be seen, then, that in accordance with the method of the present invention, the temperature of the circulating liquid is controlled as a function both of the circulating liquid temperature and of the ambient temperature, to obtain maximum flexibility in controlling the panel temperature.

It will be noted that the air flowing through the housing passes first over the thermostat, then over the heat exchanger, pump and motor to carry away heat. If the air flow were to be reversed, the motor heat would alter the ambient temperature as sensed by the thermostat, and might upset the proper operation of the control. Also, it will be noted that the thermostat is located upstream of the heat exchanger in the air flow path to avoid convective heat exchange between the heat exchanger block and the bimetal. Convective heat exchange would be subject to variations under the influence of variable air currents and is, therefore, less reliable than the radiant relationship already described.

What is claimed is:

1. In a liquid heating and circulating unit, in combination, a circulating pump, a motor connected to said pump for driving said pump, a heat exchanger in circuit with said pump and comprising walls defining a chamber within which to heat liquid and an electrically energized heating element in heat conductive relation with one of said chamber walls for supplying heat to said liquid through said one wall, an electric circuit including a switch connected in series with said heating element, said switch including a bimetallic element adapted to open and close said switch in response to increases and decreases in the temperature of said bimetallic element, said switch being mounted on one wall of said chamber with said bimetallic element spaced from and extending parallel to said one wall to be exposed to heat radiated from said one wall, a housing enclosing said motor, said pump, said heat exchanger and said switch, air inlet and outlet openings in said housing, and a fan coupled to be driven by said motor so as to circulate air from said inlet to said outlet opening, said bimetallic element being located upstream of said motor, said pump and said heat exchanger in the path of air flow through said housing.

2. In a personal thermal device of the type comprising a liquid circuit including a liquid conducting, flexible heat-exchange panel and a circulator for circulating liquid through said circuit, the improvement which comprises a heat unit for heating said liquid and for controlling the supply of heat to said liquid, said heat unit comprising walls defining a chamber within which to heat liquid, an electrically energized heating element in contact with one of said walls for heating the liquid in said chamber, a switch in circuit with said heating element for controlling the supply of electric current ot said element, a housing enclosing said heat unit, means for circulating air through said housing, said switch comprising a first contact and a second contact, said second contact comprising a bimetal strip mounted in said housing and exposed to said walls and to said air to move toward and away from said first contact in response to changes in the temperature of said chamber walls and of said air.

3. In a personal thermal device of the type comprising a liquid circuit including (1) a liquid conducting, flexible, heat-exchange panel through which to circulate liquid, (2) a pump for circulating liquid through said circuit, (3) means defining a chamber within which to heat liquid, and (4) supply and return lines connecting said pump to said panel, and wherein there is included an electrical heating element in heat exchange relation to the liquid in said chamber, the improvement which comprises a temperature-sensitive switch in series with said heating element, said switch being arranged to respond to the temperature of said chamber-defining means and to the temperature of the ambient air in the area in which said device is located.

4. In a personal thermal device of the type comprising a liquid circuit including a liquid conducting, flexible, heat-exchange panel and a circulator for circulating liquid through said circuit, the improvement which comprises a heat unit for heating said liquid and for controlling the supply of heat to said liquid, said heat unit comprising a housing, walls inside said housing defining a chamber in said circuit within which to heat liquid, an electrically energized heating element in heat-exchange relation with one of said chamber walls for supplying heat to said liquid through said one wall, an electric circuit including a switch connected in series with said heating element for controlling the supply of electric current to said heating element, a temperature-responsive actuator coupled to said switch for opening and closing said switch, said actuator being mounted in radiant heat-exchange relation to said chamber walls, and means for circulating air through said housing, said actuator being in the path of air flow through said housing.

5. In a liquid heating and circulating unit, in combination, a circulating pump, a motor connected to said pump for driving said pump, a heat exchanger in circuit with said pump and comprising walls defining a chamber within which to heat liquid and an electrically energized heating element in heat conductive relation with said chamber walls for supplying heat to said liquid through said walls, an electric circuit including a switch connected in series with said heating element, said switch including temperature-responsive actuating means adapted to open and close said switch in response to increases and decreases in the temperature of said actuating means, said switch being mounted adjacent to said chamber walls with said actuating means exposed to heat radiated from said chamber walls, a housing enclosing said motor, said pump, said heat exchanger and said switch, inlet and outlet openings in said housing through which to admit air to and discharge air from said housing, and a fan coupled to be driven by said motor so as to circulate air from said inlet to said outlet opening, said switch being located upstream of said motor, said pump and said heat exchanger in the path of air flow through said housing.

6. In a liquid heating and circulating unit, in combination, a circulating pump, a motor connected to said pump for driving said pump, a heat exchanger in circuit with said pump and comprising walls defining a chamber within which to heat liquid and an electrically energized heating element in heat conductive relation with said chamber walls for supplying heat to said liquid through said walls, an electric circuit including a switch connected in series with said heating element, said switch including bimetallic, temperature-responsive actuating means adapted to open and close said switch in response to increases and decreases in the temperature of said actuating means, said switch being mounted on one of said chamber walls with said actuating means exposed to heat radiated from said chamber walls, a housing enclosing said motor, said pump, said heat exchanger and said switch, inlet and outlet openings in said housing through which to admit air to and discharge air from said housing, and a fan coupled to be driven by said motor so as to circulate air from said inlet to said outlet opening, said switch being located in the path of air flow through said housing upstream of said motor, said pump and said heat exchanger.

7. A heating and circulating unit for circulating controlled-temperature heated liquid through a closed liquid circuit, said unit comprising a housing, a circulating pump in the upper portion of said housing, a motor in the lower portion of said housing for driving said pump, a fan in said housing below said motor and driven by said motor, a heat exchanger mounted in said housing adjacent to said pump and comprising a block of heat conductive material having a liquid-conducting passage therethrough and connected in series with said pump in said liquid circuit, an electrical heating element embedded in said block, an electric circuit for supplying heating current to said heating element and including a switch mounted above said heat exchanger and connected in series with said heating element for controlling the supply of heating current to said heating element, said switch including a bimetallic element which is arranged to receive heat from said block, said housing having an inlet opening therein adjacent to said switch for admitting ambient air to said housing in response to operation of said fan and an outlet opening below said fan through which to discharge said air from said housing, said fan being arranged to draw air into said housing through said inlet opening and discharge air through said outlet opening.

8. Method of regulating the temperature of a personal thermal device of the type comprising a liquid circuit including a flexible, liquid-conducting panel and a circulator for circulating liquid through said circuit, said method comprising the steps of supplying heat to the circulated liquid, and controlling the amount of heat supplied to said liquid as a combined function both of the liquid temperature in said circuit and of the ambient temperature in the area in which said device is located.

9. Method of regulating the temperature of a personal thermal device of the type comprising a liquid circuit including a flexible, liquid-conducting panel, a heat-exchanger within which to heat liquid and a circulator for circulating liquid through said circuit, said method comprising the steps of supplying heat to said heat exchanger to heat the liquid circulated therethrough, measuring the temperature of said heat exchanger, measuring the temperature of the ambient air around said device, and turning on and off the supply of heat to said heat exchanger as the combined temperatures of said ambient air and said heat exchanger decrease and increase.

10. In a personal thermal device of the type comprising a liquid circuit including (1) a liquid conducting, flexible, heat-exchange panel through which to circulate liquid, (2) a pump for circulating liquid through said circuit, (3) means defining a chamber within which to heat liquid, and (4) supply and return lines connecting said pump to said panel, and wherein there is included an electrical heating element in heat exchange relation to the liquid in said chamber, the improvement which comprises a temperature-sensitive switch controlling the electrical energization of said heating element, a housing for said pump and said chamber-defining means, said housing having an opening therein, said temperature-sensitive switch being exposed through said opening to the temperature of the ambient air surrounding said housing, said temperature-sensitive switch being in conductive heat-exchange relation with said chamber-defining means, said temperature-sensitive switch responding to the temperature of said chamber-defining means and to the temperature of the ambient air in which said device is located.

11. A heating and circulating unit for a personal thermal device for circulating controlled-temperature heated liquid through a closed liquid circuit including a liquid-conducting, flexible, heat-exchange panel, said unit including a housing, a circulating pump in the housing, a motor in the lower portion of the housing beneath said pump for driving said pump, a heat exchanger mounted in said housing adjacent to said pump and comprising means defining the walls of a liquid containing chamber in liquid circuit in series with said pump and said panel, an electrical heating element embedded in the walls of said chamber, an electric circuit for supplying heating current to said heating element and including a temperature-sensitive switch in series with said heating element for controlling the supply of heating current to said heating element, said switch including a bimetallic element which is arranged to be responsive to the temperature of said chamber walls, and said housing having an opening admitting ambient air into said housing, said bimetallic element being responsive to the temperature of the ambient air, said temperature-sensitive switch responding to the temperature of said ambient air and responding to the temperature of said chamber walls and controlling the supply of heating current to said heating element in accordance therewith.

References Cited in the file of this patent

UNITED STATES PATENTS

| | | |
|---|---|---|
| 2,203,425 | Welch | June 4, 1940 |
| 2,228,906 | Bowen | Jan. 14, 1941 |
| 2,344,812 | Gill | Mar. 21, 1944 |
| 2,491,849 | Broome | Dec. 20, 1949 |
| 2,594,101 | Volker | Apr. 22, 1952 |
| 2,753,435 | Jepson | July 3, 1956 |